United States Patent [19]

Reveles et al.

[11] Patent Number: 6,075,785
[45] Date of Patent: Jun. 13, 2000

[54] APPARATUS AND METHOD FOR PROVIDING MEMORY ADDRESS INTERCHANGING FOR HIGH SPEED MEMORY ACCESSES

[75] Inventors: Frank Manuel Reveles, Aurora; Kevin Ernest Sallese, Plainfield; Charles Joseph Wilde, Naperville, all of Ill.

[73] Assignee: Lucent Technologies Inc., Murray Hill, N.J.

[21] Appl. No.: 08/991,795

[22] Filed: Dec. 16, 1997

[51] Int. Cl.[7] .................................................. H04Q 11/00
[52] U.S. Cl. ........................... 370/376; 370/362; 370/366
[58] Field of Search .................................. 370/357, 360, 370/362, 363, 364, 365, 369, 375, 376, 366

[56] References Cited

U.S. PATENT DOCUMENTS

| | | | |
|---|---|---|---|
| 4,596,010 | 6/1986 | Beckner et al. | 370/354 |
| 5,329,524 | 7/1994 | Baker et al. | 370/370 |
| 5,345,441 | 9/1994 | Baker et al. | 370/358 |
| 5,351,236 | 9/1994 | Pawelski | 370/358 |
| 5,905,734 | 5/1999 | Wille et al. | 370/524 |

*Primary Examiner*—Ajit Patel
*Assistant Examiner*—Bob A. Phunkulh
*Attorney, Agent, or Firm*—Jack R. Penrod

[57] ABSTRACT

A method and apparatus for accessing data of a telecommunications interface control RAM to meet the two different requirements of the two types of devices accessing the control RAM. Data for output ports are typically aligned such that time-slot 0 for each port leaves the network at the same time. The hardware therefore requests that the control RAM be organized such that the first N locations correspond to time-slot 0 of all output ports, the next N locations to time-slot 1 of all ports, and so on with the final N locations corresponding to the last time-slot of all ports. The software addressing under processor control, on the other hand, uses data structure groups which are a function of the communication ports. Connecting a least significant group of address lines address lines of a control bus respectively to a most significant group of address lines of the control RAM and connecting a more significant group of address lines of the control bus respectively to a least significant group of address lines of the control RAM provides linear addressing sequences of the control bus to result in every N th. control RAM location being accessed. Such addressing typically stores the first N locations correspond to all of the time-slots on port 0, the next N locations for all time-slots on port 1 and so on with the final N locations corresponding to all the time-slots of the last port. After this data storing, software addressing under processor control performs these address translation function using sequential addressing to access the control RAM and the address line connections provide a rapid and effective translation.

5 Claims, 2 Drawing Sheets

APPARATUS AND METHOD FOR PROVIDING MEMORY ADDRESS INTERCHANGING FOR HIGH SPEED MEMORY ACCESSES

CROSS REFERENCE

This application is related to A METHOD AND APPARATUS FOR PROVIDING A SELECTABLE SPEED DATA LINK IN A TELECOMMUNICATION SYSTEM, by F. Reveles, K. Sallese and C. Wilde, commonly assigned and filed concurrently herewith.

1. Technical Field

The invention relates to transmission of data and more particularly to a method and apparatus for transmission of data from a high speed trunk to a data line.

2. Description of the Prior Art

Within known telecommunication systems, such as described in U.S. Pat. No. 4,596,010 by Beckner et al., which use some type of switch fabric as the interconnect, a control RAM is often used to store the connection information. Port connections into and out of the fabric interconnect typically carry many individual groups of data refereed to as time slots. For control purposes there exists at least one control RAM location that corresponds to each of the time slots.

The physical organization requirements of the Control RAM usually are different depending on the device accessing the Control RAM. For example, all data output ports are typically aligned such that time-slot 0 for each port leaves the network at the same time. Hardware therefore requests that the Control RAM be organized such that the first N locations correspond to time-slot 0 of all output ports, the next N locations to TS 1 of all ports, and so on with the final N locations corresponding to the last time-slot of all ports. Software addressing under processor control, on the other hand, uses data structure groups which are a function of the communication ports. Such addressing typically has the first N locations correspond to all of the time-slots on port 0, the next N locations for all time-slots on port 1 and so on with the final N locations corresponding to all the time-slots of the last port. So, the software addressing under processor control performs these address translation function in order to access the control RAM thereby incurring increased processor time and complexity. Thus, there is a need in the art for a fast operating method and apparatus to accommodate the above opposing interests in the art for Control RAM operation.

SUMMARY OF THE INVENTION

Briefly stated, in accordance with one aspect of the invention, the above described problem is solved and an advance in the art is achieved by providing an address translation method which includes the step of connecting a least significant group of address lines address lines of a control bus respectively to a most significant group of address lines of a control RAM. The method also includes the step of connecting a more significant group of address lines of the control bus respectively to a least significant group of address lines of the control RAM. Connected in this manner, linear addressing sequences of the control bus results in every 16 th control RAM location being accessed, which corresponds to accessing one communication port of the multiplicity of communication ports In accordance with one aspect of the invention, the above described problem is solved for a TSI telecommunication device having 16 output ports and operating with 128 time slots per frame by a method for address translation which includes the step of connecting least significant address lines 0, 1, 2, 3, 4, 5 and 6 address lines of a control bus respectively to most significant address lines 4, 5, 6, 7, 8, 9 and 10 of a control RAM. The method also includes the step of connecting more significant address lines 7, 8, 9 and 10 of the control bus respectively to least significant 0, 1, 2 and 3 address lines of the control RAM.

In accordance with another aspect of the invention, the above described problem is solved for a TSI telecommunication device having 16 output ports and operating with 128 time slots per frame by an apparatus which includes means for connecting least significant address lines 0, 1, 2, 3, 4, 5 and 6 address lines of a control bus respectively to most significant address lines 4, 5, 6, 7, 8, 9 and 10 of a control RAM, and means for connecting more significant address lines 7, 8, 9 and 10 of the control bus respectively to least significant 0, 1, 2 and 3 address lines of the control RAM. Such an address connection provides a translation in which sequential linear accesses by a control processor result in every 16 th. memory location being accessed, which corresponds to accessing one communication port of the multiplicity of communication ports.

In accordance with another aspect of the invention, the aforementioned problem is solved and an advance in the art achieved by providing an apparatus for use with a switch fabric having 16 output ports and operating with 128 time slots per frame including a multiplexer connected to a first address bus having address lines 0, 1, 2, 3, 4, 5, 6, 7, 8, 9 and 10 from least significant to most significant order. The multiplexer is connected at a second address bus having least significant address lines 0, 1, 2, 3, 4, 5 and 6 address lines respectively connected to most significant address lines 4, 5, 6, 7, 8, 9 and 10 of a control RAM, and means for connecting more significant address lines 7, 8, 9 and 10 of the control bus respectively to least significant 0, 1, 2 and 3 address lines of the control RAM, wherein the address connection provides a translation in which sequential linear accesses by the second address bus results in every 16 th. memory location being accessed, which corresponds to accessing one communication port of the multiplicity of communication ports.

DETAILED DESCRIPTION

Figure 1:
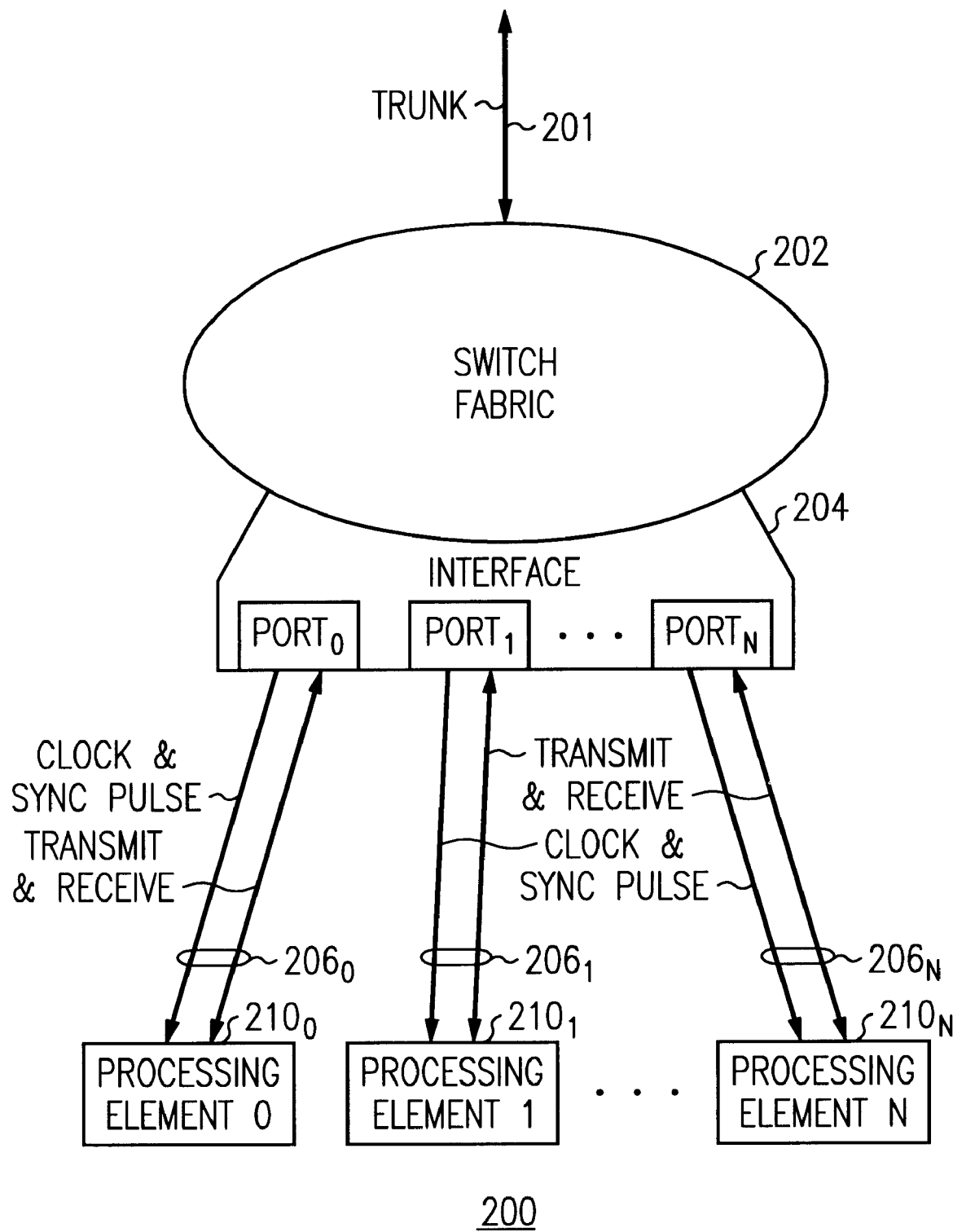
FIG. 1 is a block diagram illustration of part of a telecommunication switch system communicating to external protocol handlers over data lines.
Figure 2:
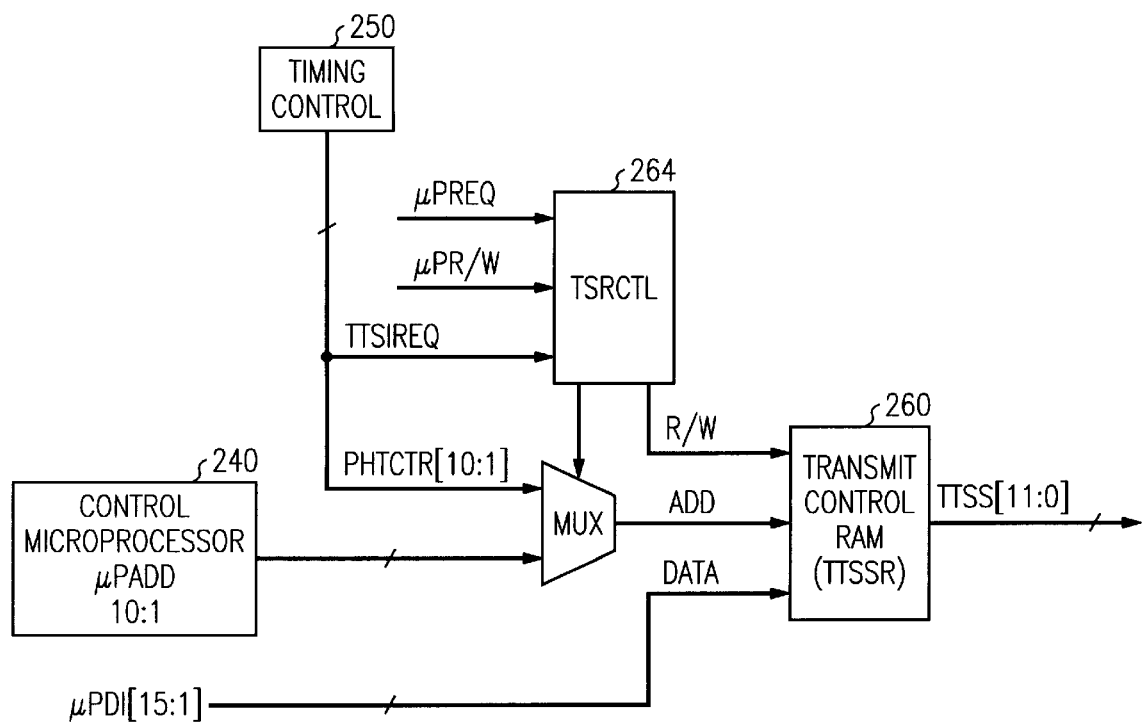
FIG. 2 is a block diagram of illustration of a part of an interface module that controls the accessing of a Control RAM.

Referring now to FIG. 1, a simplified diagram of a telecommunications switch system 200 is shown. The present invention is an apparatus and method that helps data communication between high speed trunk 201 and processing elements $210_0$-$210^N$, which are also known as protocol handlers. In a preferred embodiment, much of the present apparatus and method resides in each of the interface module IF 204 in an Application Specific Integrated Circuit (ASIC). The interface module 204 has N+1 ports which connect to N+1 duplex data links $206_0$-$206_N$. Each of these data links $206_0$-$206_N$ can operate at one of multiple selectable data rates.

Interface module 204 has Control RAMs known as time-slot select RAMs, one each for the receive direction (RTSSR) and the transmit direction (TTSSR) which control the mapping between the network side time slots to and from the switch fabric 202 and the peripheral side time slots from and to the processing elements $210_0$–$210_N$. The Receive Time-Slot Select RAM, RTSSR, (not shown) accepts requests for access from the Receive portion of Switch Fabric 202 and a Control Microprocessor 240. The Receive portion of Switch Fabric 202 can only read the RTSSR, while the Control Microprocessor can either read or write the RTSSR.

Figure 3:
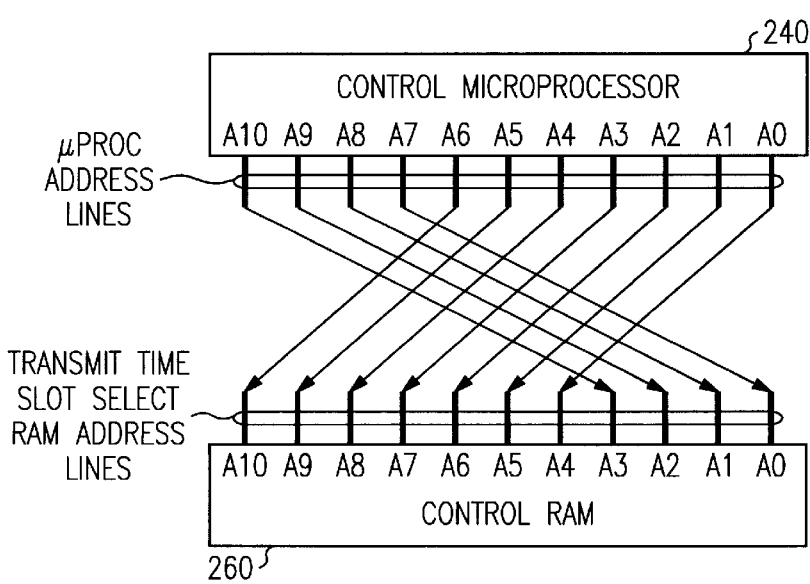
FIG. 3 is a diagram of a mapping of control microprocessor address lines to a Transmit Control RAM.

The Transmit Time-Slot Select RAM (TTSSR 260), shown in FIG. 3, accepts requests for access from the Transmit portion of the Switch Fabric 202, which in a preferred embodiment is a time slot interchanger (TSI). Timing Control unit 250 transmits these access request from the Switch Fabric 202 to the TTSSR 260. The TTSSR 260 also accepts requests for access by the Control Microprocessor 240. The Transmit portion of Switch Fabric 202, like the Receive portion, can only read the TTSSR 260, while the control microprocessor 240 can either read or write the TTSSR. These read/write rules are enforced by control logic within transmit select RAM control (TSRCTL) 264.

The Control RAM 260, in a preferred embodiment, is physically organized as 2048 addressable locations each 12 bits wide. Each 12-bit word is divided into a 10 bit data field (used as a 10-bit address into a time slot data RAM not shown), an enable bit for single or double buffering, and a parity bit generated in the switch fabric 202.

Mapping information is physically stored in the TSSR 260 in groups of 16 which correspond to the N PHDB ports, which in the preferred embodiment N=16. The first N locations contain mapping information for time-slot 0 of all N PHDB ports. The next N locations contain mapping information for time-slot 1 of all PHDB ports, and so on with the final N locations (of the 2048 total) containing mapping information for time-slot 127 of all N PHDB ports. Storing the mapping information in this way allows the switch fabric counters to count sequentially and provide mapping in the correct order needed realizing that all PHDB ports are phase aligned and thus require mapping for time-slot 0 at relatively the same time.

From a microprocessor 240 interface point of view, the 1st 128 address locations of TSSR 260 correspond to the time-slots of port 0, the next 128 locations to port 1 and so on with the final 128 address locations corresponding to time-slots of port 15. The differing view between the microprocessor and the switch fabric is due to an adjustment of the microprocessor address before presenting it to a TSSR 260. The adjustment is necessary to accommodate differing hardware and software interests. One very good place to locate this adjustment is on the inputs of MUX 258 which multiplexes address information from either timing controller 250 or control microprocessor 240. The address adjustment and its results can best be described with the help of FIG. 3.

Using the translation for N=16 embodiment described above and shown in FIG. 3, linear access of TSSR memory (e.g. 0, 1, 2, 3,) by the control microprocessor 240 results in every 16th location being accessed (i.e. 0, 16, 32, 48). This is in contrast to the linear access of TSSR memory (e.g. 0, 1, 2, 3,) by the timing controller 250 in conjunction with a transmit TSI request response by TSRCTL 264 to change the state of multiplexer 258 which results in sequential TSSR memory locations ( 0, 1, 2, and 3) being accessed.

Access requests made by the receive or transmit switch fabric units occur at regular intervals and correspond to the time required to map 2048 peripheral side time-slots within a 125 microsec time frame. Since a 32Mhz clock is used a 30.5 ns period results, yielding 4096 clock cycles per frame, and slots for the 2048 switch fabric accesses can be scheduled every other clock cycle. These accesses cannot be preempted. The time slots between the switch fabric accesses of the TSSR 260 are available for the control microprocessor 240, leaving 2048 chances for possible microprocessor accesses. With this arrangement, the longest the control microprocessor 240 will have to wait for a TSSR cycle is two 32Mhz clock periods. This is a very rapid response provided by the hardware based addressing method.

Thus, it will now be understood that there has been disclosed a method and apparatus for very rapidly accessing control data stored in a control RAM using linear addressing while achieving port organized accesses. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. An address translation method comprising the steps of connecting a least significant group of address lines to address lines of a control bus respectively to a most significant group of address lines of a control RAM and connecting a more significant group of address lines of the control bus respectively to a least significant group of address lines of the control RAM, wherein connecting the address lines in this manner provides linear addressing sequences of the control bus to result in every N th. control RAM location being accessed with N being an integer that is greater than one, which corresponds to accessing one communication port of the multiplicity of communication ports.

2. The method of claim 1, wherein N=16.

3. A method for using with a TSI telecommunication device having 16 output ports and operating with 128 time slots per frame for address translation which includes the steps of connecting least significant address lines 0, 1, 2, 3, 4, 5 and 6 address lines of a control bus respectively to most significant address lines 4, 5, 6, 7, 8, 9 and 10 of a control RAM and connecting more significant address lines 7, 8, 9 and 10 of the control bus respectively to least significant 0, 1, 2 and 3 address lines of the control RAM.

4. An apparatus for use with a switch fabric having 16 output ports and operating with 128 time slots per frame by an apparatus which includes means for connecting least significant address lines 0, 1, 2, 3, 4, 5 and 6 address lines of a control bus respectively to most significant address lines 4 5, 6, 7, 8, 9 and 5, 6, 7, 8, 9 and 10 of a control RAM, and means for connecting more significant address lines 7, 8, 9 and 10 of the control bus respectively to least significant 0, 1, 2 and 3 address lines of the control RAM, wherein said address connection provides a translation in which sequential linear accesses results in every 16 th. memory location being accessed, which corresponds to accessing one communication port of the multiplicity of communication ports.

5. An apparatus for use with a switch fabric having 16 output ports and operating with 128 time slots per frame comprising:

a multiplexer connected at to a first address bus having address lines 0, 1, 2, 3, 4, 5, 6, 7, 8, 9 and 10 from least significant to most significant order;

said multiplexer connected at a second address bus having least significant address lines 0, 1, 2, 3, 4, 5 and 6 address lines respectively connected to most significant address lines 4, 5, 6, 7, 8, 9 and 10 of a control RAM, and means for connecting more significant address lines 7, 8, 9 and 10 of the control bus respectively to least significant 0, 1, 2 and 3 address lines of the control RAM, wherein said address connection provides a translation in which sequential linear accesses by said second address bus results in every 16 th. memory location being accessed, which corresponds to accessing one communication port of the multiplicity of communication ports.

* * * * *

UNITED STATES PATENT AND TRADEMARK OFFICE
CERTIFICATE OF CORRECTION

PATENT NO.     : 6,075,785                                          Page 1 of 1
DATED          : June 13, 2000
INVENTOR(S)    : Frank Manuel Reveles, Kevin Ernest Sallese, Charles Joseph Wilde It is certified that error appears in the above-identified patent and that said Letters Patent is hereby corrected as shown below:

<u>Column 4, claim 4,</u>
Line 47, change "4 5, 6, 7, 8, 9 and 5, 6, 7, 8, 9 and 10" to -- 4, 5, 6, 7, 8, 9 and 10 --.

Signed and Sealed this

Twenty-fifth Day of December, 2001

Attest:

JAMES E. ROGAN
Attesting Officer       Director of the United States Patent and Trademark Office